US009712663B2

(12) United States Patent
Lang et al.

(10) Patent No.: US 9,712,663 B2
(45) **Date of Patent: *Jul. 18, 2017**

(54) DEVICE LOCK MODE

(71) Applicant: Sonos, Inc., Santa Barbara, CA (US)

(72) Inventors: Jonathan Lang, Santa Barbara, CA (US); Chris Fowler, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 14/619,961

(22) Filed: Feb. 11, 2015

(65) Prior Publication Data

US 2015/0156101 A1 Jun. 4, 2015

Related U.S. Application Data

(63) Continuation of application No. 12/070,933, filed on Feb. 22, 2008, now Pat. No. 8,990,360.

(51) Int. Cl.

| | |
|---|---|
| ***H04M 1/725*** | (2006.01) |
| ***H04L 12/24*** | (2006.01) |
| ***G06F 9/445*** | (2006.01) |
| ***G06F 11/22*** | (2006.01) |
| ***G06F 11/30*** | (2006.01) |
| ***H04L 12/26*** | (2006.01) |

(52) U.S. Cl.

CPC .......... *H04M 1/72577* (2013.01); *G06F 8/65* (2013.01); *G06F 11/2294* (2013.01); *G06F 11/30* (2013.01); *H04L 41/22* (2013.01); *H04L 41/50* (2013.01); *H04L 43/10* (2013.01)

(58) Field of Classification Search

CPC .... G06F 21/10; G06F 11/2294; G06F 1/3203; G06F 1/3206; G06F 1/3215; G06F 8/65; G06F 11/30; H04L 12/2803; H04L 12/2805; H04L 2012/2849; H04L 41/22; H04L 43/10; H04L 41/50; H04L 67/025; H04L 12/26; H04L 12/24; Y10S 707/99939; H04M 1/72577; H04M 3/16; H04R 2205/024

See application file for complete search history.

(56) References Cited

U.S. PATENT DOCUMENTS

| | | | |
|---|---|---|---|
| 5,440,644 | A | 8/1995 | Farinelli et al. |
| 5,732,275 | A | 3/1998 | Kullick et al. |
| 5,761,320 | A | 6/1998 | Farinelli et al. |

(Continued)

FOREIGN PATENT DOCUMENTS

| | | | |
|---|---|---|---|
| EP | 1389853 | A1 | 2/2004 |
| WO | 0153994 | | 7/2001 |
| WO | 03093950 | A2 | 11/2003 |

OTHER PUBLICATIONS

"AudioTron Quick Start Guide, Version 1.0", Voyetra Turtle Beach, Inc., Mar. 2001, 24 pages.

(Continued)

*Primary Examiner* — Sargon Nano

(57) ABSTRACT

A system, method, and computer program for remotely managing a digital device is provided. One or more digital devices are monitored. At least one matter associated with the one or more digital devices is identified. A resolution to address the at least one matter is generated. The resolution is then distributed from a remote location.

19 Claims, 5 Drawing Sheets

400

Zone Menu

Living Room

Office

Patio

Duran Duran

Medazzaland

Dealer Lock Mode

On

Off

402

Link Zone | Drop Zone | Pause All

(56) References Cited

U.S. PATENT DOCUMENTS 5,764,992 A 6/1998 Kullick et al.
5,918,213 A 6/1999 Bernard et al.
5,923,902 A 7/1999 Inagaki
6,011,489 A 1/2000 Ki Kwan et al.
6,032,202 A 2/2000 Lea et al.
6,256,554 B1 7/2001 DiLorenzo
6,289,455 B1 * 9/2001 Kocher ................ G06Q 20/367 380/228
6,404,811 B1 6/2002 Cvetko et al.
6,469,633 B1 10/2002 Wachter
6,522,886 B1 2/2003 Youngs et al.
6,611,537 B1 8/2003 Edens et al.
6,631,410 B1 10/2003 Kowalski et al.
6,727,826 B1 4/2004 Ki Kwan et al.
6,757,517 B2 6/2004 Chang
6,778,869 B2 8/2004 Champion
7,130,608 B2 10/2006 Hollstrom et al.
7,130,616 B2 10/2006 Janik
7,143,939 B2 12/2006 Henzerling
7,174,312 B2 2/2007 Harper et al.
7,236,773 B2 6/2007 Thomas
7,295,548 B2 11/2007 Blank et al.
7,391,791 B2 6/2008 Balassanian et al.
7,467,404 B2 12/2008 McAllister et al.
7,483,538 B2 1/2009 McCarty et al.
7,571,014 B1 8/2009 Lambourne et al.
7,630,501 B2 12/2009 Blank et al.
7,643,894 B2 1/2010 Braithwaite et al.
7,657,910 B1 2/2010 McAulay et al.
7,778,635 B2 8/2010 Crookham et al.
7,853,341 B2 12/2010 McCarty et al.
7,987,238 B2 7/2011 Hook et al.
7,987,294 B2 7/2011 Bryce et al.
8,014,423 B2 9/2011 Thaler et al.
8,045,952 B2 10/2011 Qureshey et al.
8,103,009 B2 1/2012 McCarty et al.
8,234,395 B2 7/2012 Millington et al.
8,243,141 B2 8/2012 Greenberger et al.
8,483,853 B1 7/2013 Lambourne
8,657,021 B1 * 2/2014 Preta ...................... A62C 37/50 169/54
8,886,933 B1 11/2014 Poiesz et al.
8,942,252 B2 1/2015 Balassanian et al.
2001/0042107 A1 11/2001 Palm
2002/0022453 A1 2/2002 Balog et al.
2002/0026442 A1 2/2002 Lipscomb et al.
2002/0091815 A1 * 7/2002 Anderson ............. G06Q 10/06 709/223
2002/0116082 A1 8/2002 Gudorf
2002/0124097 A1 9/2002 Isely et al.
2002/0180803 A1 12/2002 Kaplan et al.
2003/0025689 A1 2/2003 Kim
2003/0083925 A1 5/2003 Weaver et al.
2003/0084337 A1 5/2003 Simionescu et al.
2003/0088538 A1 5/2003 Ballard
2003/0135381 A1 7/2003 Mathiesen et al.
2003/0157951 A1 8/2003 Hasty
2003/0233436 A1 * 12/2003 Slemmer ............. G05B 13/028 709/223
2004/0024478 A1 2/2004 Hans et al.
2004/0048233 A1 3/2004 Matthews et al.
2004/0049547 A1 3/2004 Matthews et al.
2004/0117631 A1 6/2004 Colvin
2004/0117644 A1 6/2004 Colvin
2004/0117663 A1 6/2004 Colvin
2004/0117664 A1 6/2004 Colvin
2004/0225894 A1 11/2004 Colvin
2004/0255000 A1 12/2004 Simionescu et al.
2005/0015760 A1 1/2005 Ivanov et al.
2006/0041887 A1 2/2006 Dusio
2006/0059434 A1 3/2006 Boss et al.
2006/0268664 A1 11/2006 Lewis et al.
2006/0293802 A1 * 12/2006 Kitao ...................... B60R 25/00 701/2
2007/0028120 A1 2/2007 Wysocki et al.
2007/0093243 A1 4/2007 Kapadekar et al.
2007/0142944 A1 6/2007 Goldberg et al.
2007/0264984 A1 11/2007 Stavenow et al.
2007/0293232 A1 12/2007 Nonaka
2008/0168135 A1 7/2008 Redlich et al.
2008/0225124 A1 9/2008 Schinner et al.
2008/0244033 A1 10/2008 Hook et al.
2008/0262666 A1 * 10/2008 Manning ................ A63C 17/12 701/21
2008/0288615 A1 11/2008 Bajwa et al.
2009/0094540 A1 4/2009 Gray et al.
2009/0098736 A1 4/2009 Iijima et al.
2009/0216855 A1 8/2009 Lang et al.
2010/0255772 A1 10/2010 Hellman
2010/0318685 A1 * 12/2010 Kraus ................ G07C 9/00944 709/249
2011/0130865 A1 * 6/2011 Setzer, Sr. ................. B66F 9/08 700/213
2011/0288696 A1 * 11/2011 Lefebure ................ A63H 27/12 701/2
2014/0108841 A1 * 4/2014 Tomi ....................... G06F 1/206 713/323

OTHER PUBLICATIONS

"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, 26 Jul. 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
Sonos, Inc, "Sonos Digital Music System, User Guide", Version 090101, Sep. 2006, 170 pages.
The United States Patent and Trademark Office, "Notice of Allowance", issued in connection with U.S. Appl. No. 12/070,933, mailed on Nov. 21, 2014, 23 pages.
The United States Patent and Trademark Office, "Non-Final Office action", issued in connection with U.S. Appl. No. 12/070,933, mailed on Aug. 4, 2014, 19 pages.
The United States Patent and Trademark Office, "Final Office action", issued in connection with U.S. Appl. No. 12/070,933, mailed on Jan. 14, 2014, 12 pages.
The United States Patent and Trademark Office, "Non-Final Office action", issued in connection with U.S. Appl. No. 12/070,933, mailed on Jul. 29, 2013, 16 pages.
The United States Patent and Trademark Office, "Advisory action", issued in connection with U.S. Appl. No. 12/070,933, mailed on Feb. 10, 2012, 3 pages.
The United States Patent and Trademark Office, "Final Office action", issued in connection with U.S. Appl. No. 12/070,933, mailed on Nov. 23, 2011, 14 pages.

(56) References Cited

OTHER PUBLICATIONS

The United States Patent and Trademark Office, "Non-Final Office action", issued in connection with U.S. Appl. No. 12/070,933, mailed on Mar. 29, 2011, 12 pages.
The United States Patent and Trademark Office, "Advisory action", issued in connection with U.S. Appl. No. 12/070,933, mailed on Aug. 31, 2010, 3 pages.
The United States Patent and Trademark Office, "Final Office action", issued in connection with U.S. Appl. No. 12/070,933, mailed on Jun. 15, 2012, 15 pages.
The United States Patent and Trademark Office, "Non-Final Office action", issued in connection with U.S. Appl. No. 12/070,933, mailed on Nov. 23, 2009, 11 pages.
"Denon 2003-2004 Product Catalog," Denon, 2003-2004, 44 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Notice of Allowance mailed on May 15, 2017, issued in connection with U.S. Appl. No. 14/860,698, filed Sep. 21, 2015, 6 pages.

* cited by examiner

DEVICE LOCK MODE

CROSS-REFERENCE TO RELATED APPLICATIONS

The present application claims the benefit of priority to U.S. Non-Provisional application Ser. No. 12/070,933, filed on Feb. 22, 2008, entitled "System, method, and computer program for remotely managing a digital device", which is hereby incorporated by reference in its entirety for all purposes.

BACKGROUND

Field of the Invention

The present invention relates generally to media services, and more particularly to remotely managing a digital device.

Background Art

Conventionally, retail environments offer various products to customers. For example, digital devices can often be purchased in retail environments, such as electronic equipment stores. Because customers often want to view demonstrations of the products before purchase, the retail environments that offer the products typically maintain applications on the products that allow the products to demonstrate music, movies, and so forth.

Product demonstrations using applications are frequently outdated or otherwise not in keeping with media trends. For example, customers sometimes view demonstrations of songs or videos that are months old. Further, Internet-enabled products sometimes require the entry of account information to access services provided via the Internet.

SUMMARY OF THE INVENTION

A system, method, and computer program for remotely managing a digital device is provided. One or more digital devices are monitored. At least one matter associated with the one or more digital devices is identified. A resolution to address the at least one matter is generated. The resolution is then distributed from a remote location.

DESCRIPTION OF EXEMPLARY EMBODIMENTS

Figure 1:
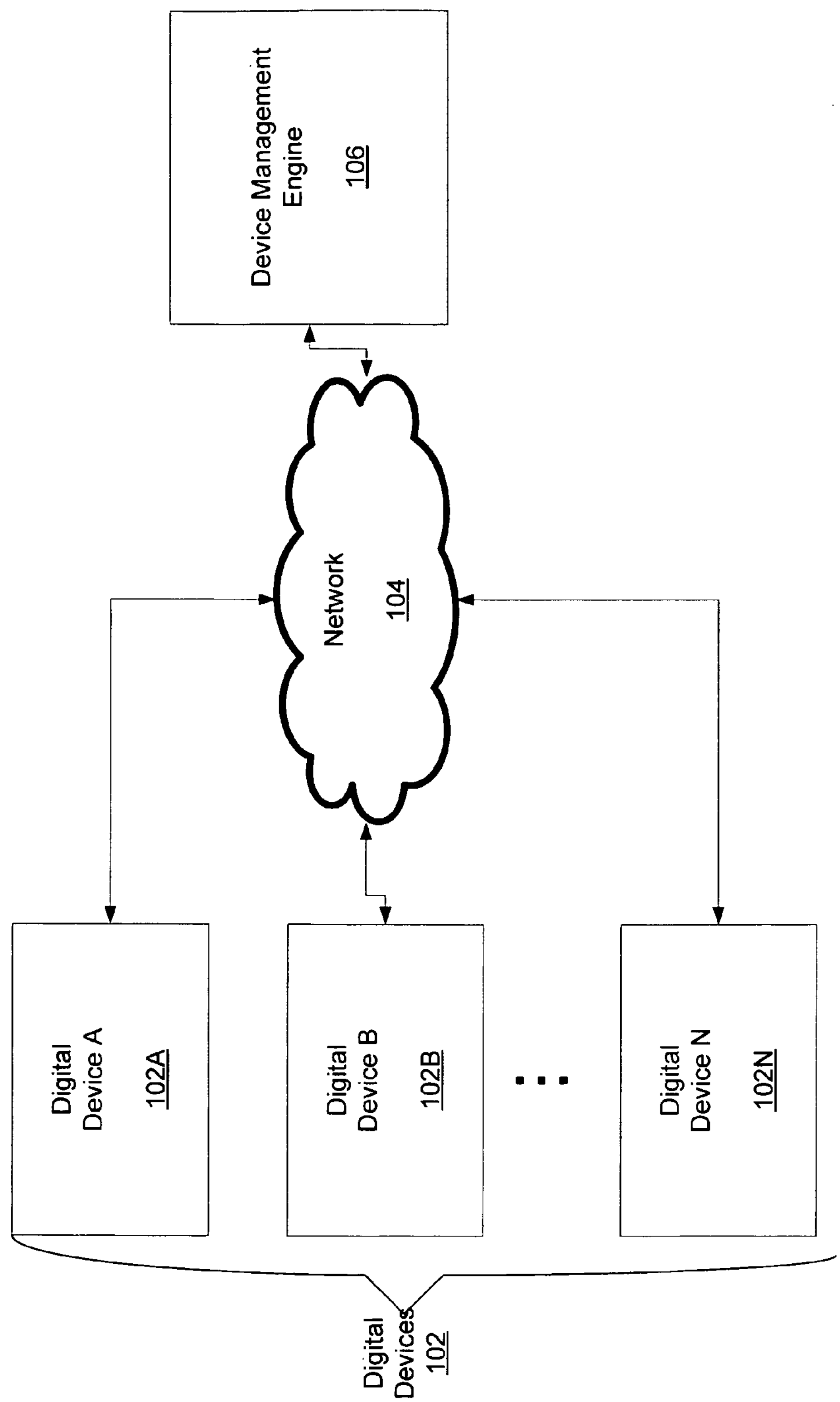
FIG. 1 is a block diagram of an exemplary environment for remotely managing digital devices.

Referring now to FIG. 1, a block diagram of an exemplary environment for remotely managing digital devices, such as digital music devices in a retail environment, is shown. A digital music system comprising a wireless, multi-room digital music system that lets you play digital music all over your house, business, or any other location may be provided. The digital music system may be controlled via a single digital music device. The digital music device may be sold in a retail environment. Similarly, a digital media system may be provided for allowing various media to be played throughout a hour, business, or any other location. The digital device may be monitored in order to provide updates, subscription service information, or any other automated data.

One or more digital devices 102, such as a digital device A 102A, a digital device B 102B, and a digital device N 102N, are in communication via a network 104 with a device management engine 106. The digital devices 102 may be associated with a retail environment, such as a retail brick and mortar store, an online retailer, and so forth. The device management engine 106 may be associated with a manufacturer, distributor, and/or service provider for the digital devices 102. Although digital devices 102 are discussed herein, any type of digital device may be managed remotely according to some embodiments.

The digital devices 102 can access the device management engine 106 via the network 104, directly, or via a computing device, such as a laptop or desktop computer, a cellular telephone, a personal digital assistant (PDA), a set top box, and so forth. According to exemplary embodiments, the device management engine 106 monitors the digital devices 102 via the network 104. In one embodiment, the digital devices 102 may connect to the device management engine 106 periodically via the network 104 to be monitored. Alternatively, the digital devices 102 may connect when an event occurs, such as when a user activate an application on the digital device 102 or attempts to log into a subscription service. The digital device 102 may initiate communication with the device management engine 106 according to some embodiments. The device management engine 106 may connect to one of the digital devices 102, which then monitors the other digital devices 102 through a local network, according to some embodiments. The digital devices 102 may be located within a retail environment or any other environment.

The digital devices 102 may be configured for demonstrations according to some embodiments. Accordingly, some of the digital devices 102 may be demonstration units and/or have modes of operation that include a demonstration mode.

Figure 2:
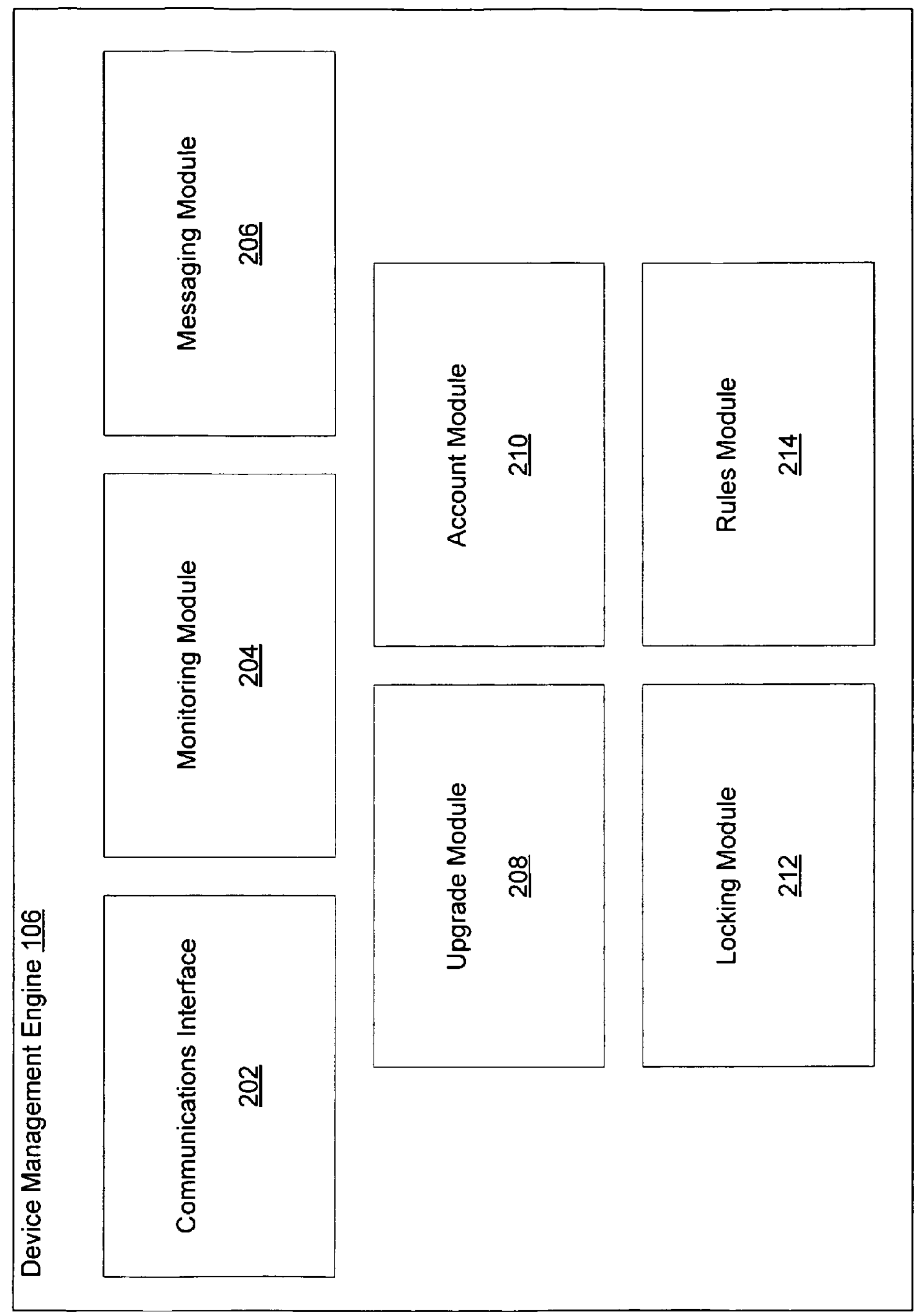
FIG. 2 is a block diagram of an exemplary device management engine.

FIG. 2 is a block diagram of an exemplary device management engine, such as the device management engine 106 shown in FIG. 1. The device management engine 106 may comprise at least a communications interface 202, a monitoring module 204, a messaging module 206, an upgrade module 208, an account module 210, and a locking module 212.

The communications interface 202 may facilitate communication between the device management engine 106 and the digital devices 102. For example, the communications interface 202 may communicate messages, such as emails, text messages, error messages, operational detail messages, software updates, and so forth to the digital devices 102.

A monitoring module 204 may monitor the one or more digital devices 102 within the retail environment. The retail environment may include one or more retail stores. For example, a retail store may sell various digital music devices, digital video devices, and so forth. Various digital devices 102 in hundreds of stores may be monitored. The monitoring module 204 may schedule times for the device management engine 106 to connect to these digital devices 102 via the network 104. The monitoring module 204 may then track user interaction with the digital devices 102, demonstrations being played by the digital devices 102, input from sales people associated with the digital devices 102, software application versions running on the digital devices 102, functioning of the digital devices 102, whether the digital devices 102 are on or off, and so forth. The digital devices 102 may push monitoring data to the device management engine 106 or the device management engine 106 may pull the monitoring data from the digital media devices 102. The monitoring may be event based, rather than schedule based. For example, the monitoring module 204 may monitor the digital media devices 102 when a dealer lock mode is enabled (discussed in further detail in associated with FIG. 4), when a retailer makes changes to the configuration associated with the digital media devices 102, and so forth.

Based on the monitoring, the monitoring module 204 may forward data obtained to one or more other modules associated with the device management engine 106.

Optionally, a telephone call or other communication may be initiated by a person or machine associated with the device management engine 106 to inform a person or machine associated with the retail environment about matters, issues, problems, etc. detected at one or more of the digital devices 102. According to one embodiment, the monitoring identifies the need for an upgrade, which triggers the communications interface 202 to send an email to someone, such as a sales person, to visit the retail environment that needs the upgrade or is experiencing other problems with the digital devices 102 being monitored.

According to some embodiments, digital devices 102 may identify themselves as retail units. The retail units may check in with the device management engine 106 to be monitored more frequently than other digital devices 102, for example. The retail units may be provided with different data from other digital devices 102 or otherwise be treated differently.

Monitoring the digital devices 102 may be utilized to identify various uses of the digital devices 102. For example, a profile for each of the digital devices 102 may be generated by the digital devices 102 or obtained from a third party, for example. The profile may then be utilized to determine what type of uses, content, or other information associated with the digital devices 102 may result in increased sales, decreased sales, or any other information associated with the retail environment. For example, retail store A may sell more of the digital devices 102, and the digital devices 102 sold at store A may have been used predominantly for Internet streaming. Any features, settings, demographics, or other information associated with the digital devices 102 may be utilized to generate the profiles. Any data from the profiles, or otherwise, may be utilized to determine sales trends.

A messaging module 206 may be provided for generating messages associated with the digital devices 102. The messages may include a resolution, such as an upgrade to software associated with the digital device 102. For example, a new version of an application on a digital video device may be provided. As another example, an updated version of an application for playing audio at a digital music device may be provided. The messaging module 206 may generate a message regarding the resolution, such as an upgrade, a message that the digital devices 102 is not functioning properly, such as being turned off or otherwise deactivated, a message with subscription or temporary access data, and so forth. Any type of message may be generated by the messaging module 206.

An upgrade module 208 may be provided in association with the device management engine 106. The upgrade module 208 may use data from the monitoring module 204 to determine whether or not a resolution comprising an upgrade of software, or other upgrades, are required or may be useful to the digital devices 102 being monitored. As discussed herein, the digital devices 102 may be monitored periodically or constantly via the network 104.

The upgrade module 208 may evaluate the data from the monitoring module 204 and determine what type of upgrade, or other resolution, to send to the digital device(s) 102. The resolution may be based on the data from the monitoring module 204 and data about the digital devices 102, itself, according to some embodiments. For example, a model number associated with the digital devices 102 may help determine the upgrade that should be sent to the digital devices 102. The upgrades or other resolution may be scheduled or randomized to avoid simultaneous upgrades to relieve strain on the device management engine 106, according to some embodiments.

The upgrade module 208 may send upgrades to the digital devices 102 based on new or updated demonstrations, new or updated audio or video tracks, bug or error fixes for existing applications, and so forth. Any type of data may be sent by the upgrade module 208. According to some embodiments, the upgrade module 208 instructs the digital devices 102 to activate itself, such as by turning itself on or registering with the device management engine 106. The upgrade module 208 may also make the upgrades available to the digital devices 102, such as by providing downloadable upgrades.

An account module 210 may be provided for registering the digital devices 102 with subscription services. The account module 210 may send subscription data, such as temporary login information, to the digital devices 102. Alternatively, the account module 210 can auto-populate a subscription registration for the digital devices 102 or otherwise automatically register the digital devices 102 for the subscription services. For example, the account module 210 may provide the digital devices 102 with a username and password for online service accounts, such as for a music download service. According to some embodiments, the account module 210 sends account information to the digital devices 102 periodically so the digital devices 102 can maintain current demonstration data. For example, the account module 210 can send subscription data to the digital devices 102 each month based on popular websites or services for the particular month.

According to some embodiments, the device management engine 106 may act as a proxy for the digital media devices 102 by communicating directly with a subscription service about a particular digital media device 102. For example, the device management engine 106 may communicate to the subscription service that digital media devices 102 with particular household identification numbers (or other identification information) are approved for trial accounts.

Optionally, each digital devices 102 and/or retail store may be provided with subscription data, such as a trial account, for example. For example, the account module 210 may provide the subscription data. The trial account may be customized for the digital devices 102 according to profile data associated with the digital devices 102, retail store location, or any other information. For example, digital devices 102 in retail stores in a Midwest region may have trial accounts for country music set up or pre-populated.

A locking module 212 may also be provided. The locking module 212 may send data to the digital devices 102 to lock the digital device 102 in a particular state. For example, the locking module 212 may remotely limit changes to settings associated with the digital device 102. In alternative embodiments, a locking mechanism may be provided on the digital devices 102, itself.

According to various embodiments, the locking mechanism may limit changes, return the digital devices 102 to a state so that a consistent presentation is displayed for another customer, prevent the deletion of files or applications, prevent certain content from being played or displayed, and so forth. For example, particular streaming content may be prevented from playing in the retail environment because it is not all-age appropriate. The locking mechanism may be implemented for any reason. The locking module 212 may remove or deactivate the locking mechanism for any reason, such as when the customer purchases the digital devices 102.

A rules module 214 may also be provided. The rules module 214 may determine a course of action when an event occurs, such as what type of resolution is appropriate, what default settings are appropriate based on registered users, registered retailers, and so forth. Specific resolutions may be provided based on rules associated with the rules module 214. For example, if the digital media device 102 is registered to a particular retailer, specific upgrades with preset features may be provided to the digital media devices 102 associated with the particular retailer. Any type of rules may be established by the rules module 214. According to exemplary embodiments, the rules module 214 may be updated with current rules data based on updates associated with retailers, the device management engine 106, the digital media devices 102, and so forth.

Although various modules are shown in FIG. 2 as part of the device management engine 106, fewer or more modules may comprise the device management engine 106 and still fall within the scope of various embodiments. For example, a retail profile database (not shown) may be provided for storing data about individual retail environments. Further, although FIGS. 1 and 2 detail the use of the digital devices 102 in retail environments, the digital devices 102 may be remotely managed within residential environments or other commercial environments. For example, the monitoring module 204 may monitor digital devices 102 in homes of users for providing remote resolutions, such as error fixes, upgrades, on/off indicators, account updates, and so forth.

In one embodiment, a retail store may register one or more of the digital devices 102 for management by completing an online registration process with the device management engine 106. The device management engine 106 provisions the digital devices 102 and the digital devices 102 are monitored and/or check in with the device management engine 106 periodically. Data from the digital devices 102 may be extracted and forwarded to subscription service providers that may then enable one or more trial accounts based on the data from the digital devices 102, such as a trial account from a music service provider.

In some embodiments, if the digital devices 102 fails to check-in with the device management engine 106 for a period of time (e.g., fourteen (14) days) the digital devices 102 may be deemed "inactive." Any trial accounts associated with the digital devices 102 deemed "inactive" may be disabled.

Figure 3:
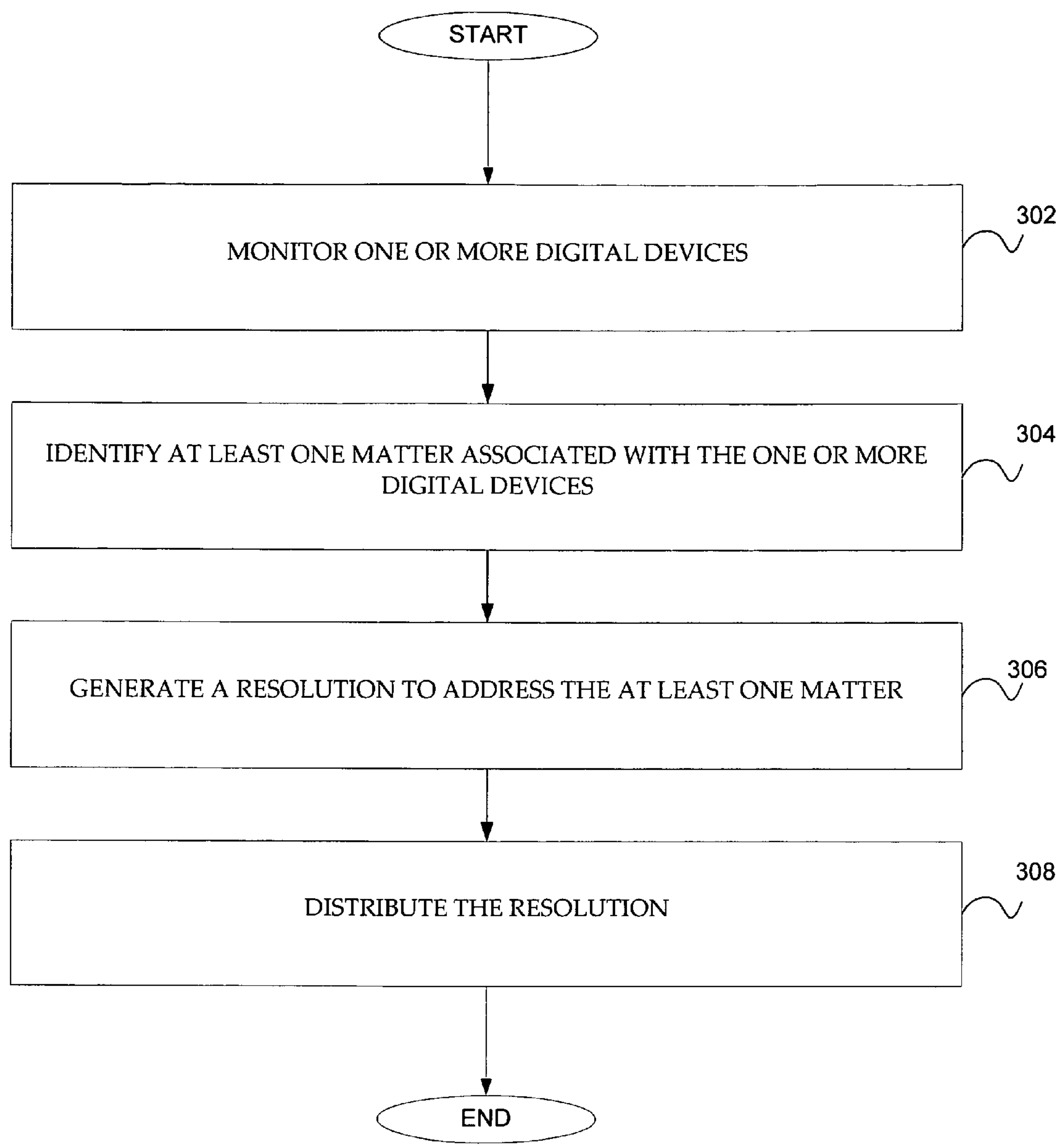
FIG. 3 is a flowchart showing an exemplary process for remotely managing digital devices in a retail environment.

FIG. 3 is a flowchart of an exemplary process for remotely managing digital devices, such as the digital devices 102 discussed herein. The digital devices 102 may comprise digital music devices or digital media devices according to exemplary embodiments. At step 302, one or more of the digital devices 102 are monitored. As discussed herein, the device management engine 106 may monitor the digital devices 102 within a retail environment, a residential environment, a commercial environment, or any other environment. The digital devices 102 may be monitored via the network 104 on a periodic basis or constantly. According to some embodiments, a retailer, a user, or any other person may request or set the frequency with which the digital devices 102 is monitored. According to other embodiments, the digital devices 102, itself, specifies the frequency for monitoring.

At step 304, at least one matter associated with the one or more digital devices 102 is identified. For example, the upgrade module 208 may identify the matter. The matter may comprise an available upgrade, a bug or error associated with an application on the digital devices 102, a lock needed to prevent particular content from being available on the digital devices 102, availability of an up-to-date demonstration, availability of subscription information for a subscription service, an operational problem, such as the device being turned off, and/or any other matter. The matter may be identified based on availability of new or up-to-date data for the digital devices 102, based on requests from the digital device or users associated with the digital devices 102, and/or based on data about the environment, such as the retail, residential, or commercial environment.

At step 306, a resolution to address the at least one matter is generated. For example, the messaging module 206 may identify the resolution. As discussed herein, based on the data about the environment and/or the digital devices 102, the digital management engine 106 may send upgrades, messages, setting limitations or changes, instructions, subscription account information, such as temporary logins and passwords, and so forth. Any type of resolution may be sent or otherwise communicated to or about the digital devices 102.

At step 308, the resolution is distributed. The resolution may be distributed directly to the digital devices 102 or to other devices associated with the environment, such as servers, computing devices, and so forth. According to some embodiments, one of the digital devices 102 receives the resolution and distributes the resolution to the other digital devices 102 in the same location or otherwise associated with the same environment. For example, in a user's home, one of the digital devices 102 may distribute upgrades to the other digital devices 102 in the same home. Accordingly, once one unit (i.e., digital devices 102) upgrades, the other units may also upgrade.

Similarly, the digital devices 102 associated with similar retail environments may also receive resolutions based on the resolution sent to one of the digital devices 102, so that a digital devices 102 at one of the retail locations perpetuates the resolutions to the digital devices 102 at more than one of, or all of, the retail environments associated with the one retail location. In alternative embodiments, each of the digital devices 102 may receive the resolution.

Figure 4A:
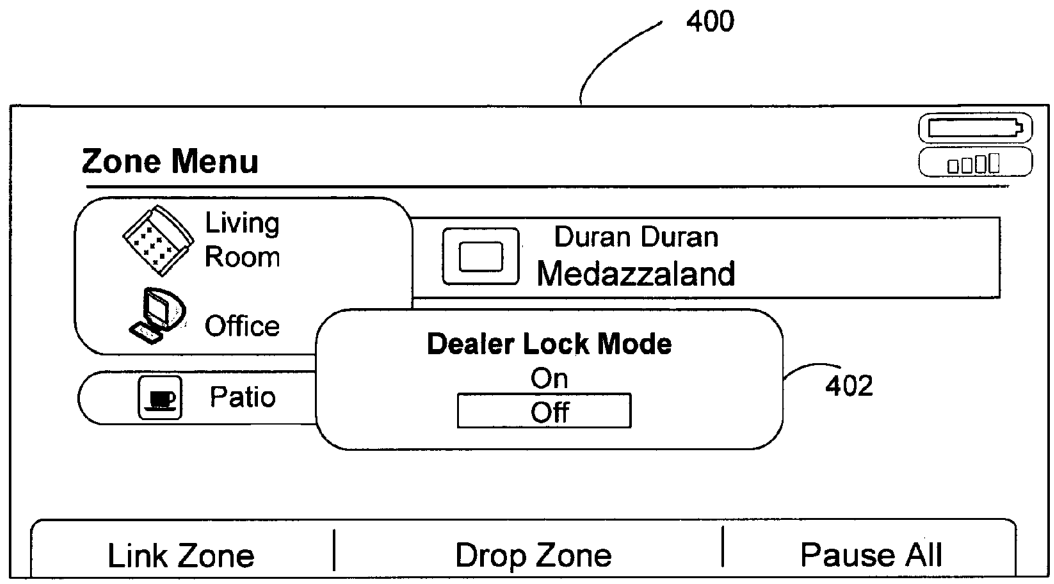
FIGS. 4A and 4B show screen shots of an exemplary lock mode associated with the digital devices.
Figure 4B:
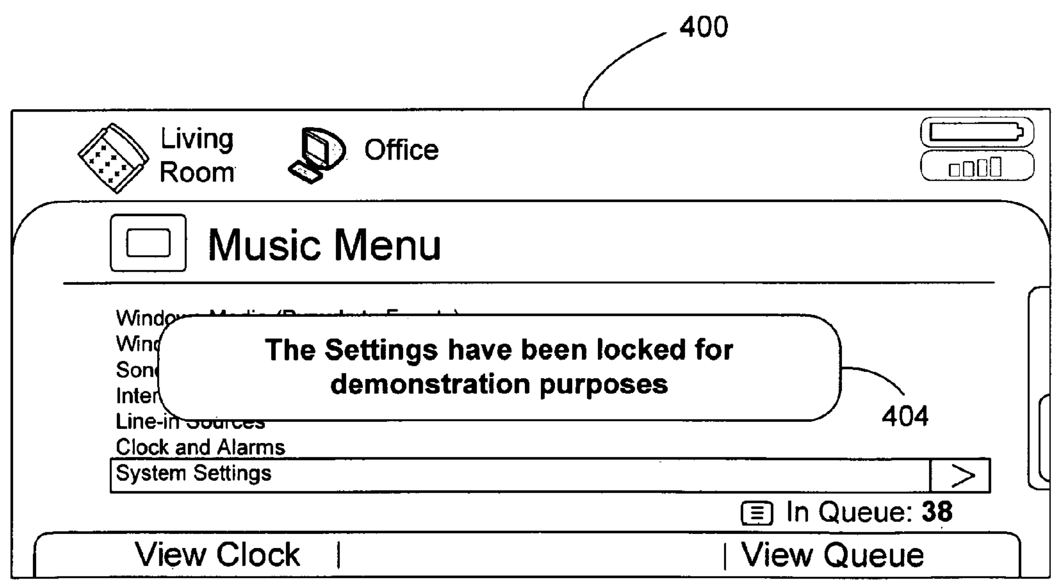

FIGS. 4A and 4B show screen shots of an exemplary lock mode associated with the digital devices 102. Menus 400 for a zone and for music are shown in FIGS. 4A and 4B, respectively. FIG. 4A shows a dealer lock mode 402. In the present example, the dealer lock Is set to "off."

FIG. 4B shows a dealer lock message 404 that communicates that "The Settings have been locked for demonstration purposes." The dealer lock mode 402 may be utilized to prevent the digital devices 102 from changes, such as system settings changes. For example, if settings associated with the digital devices 102 that are demonstration units are locked, customers, sales associates, or any other users may not be able to alter the settings for the particular digital devices 102. Accordingly, when the same digital device 102 is used for future demonstration, the original settings may be intact. Any type of settings, configuration, and so forth may be locked, such as music library management, zone player settings, controller settings, online update settings, and so forth.

The dealer lock mode 402 may be turned on or off. In some embodiments, a sequence of buttons, is used to activate the menu for the dealer lock mode 402. Once the dealer lock mode 402 is activated, the settings may be inaccessible. When a user selects a settings option from the menus 400, a message, such as the dealer lock message 404, may be displayed. Optionally, a retail location may be provided with a pass code for deactivating the dealer lock mode 402. Any type of system may be implemented for activating or deactivating the dealer lock mode 402.

Figure 5:
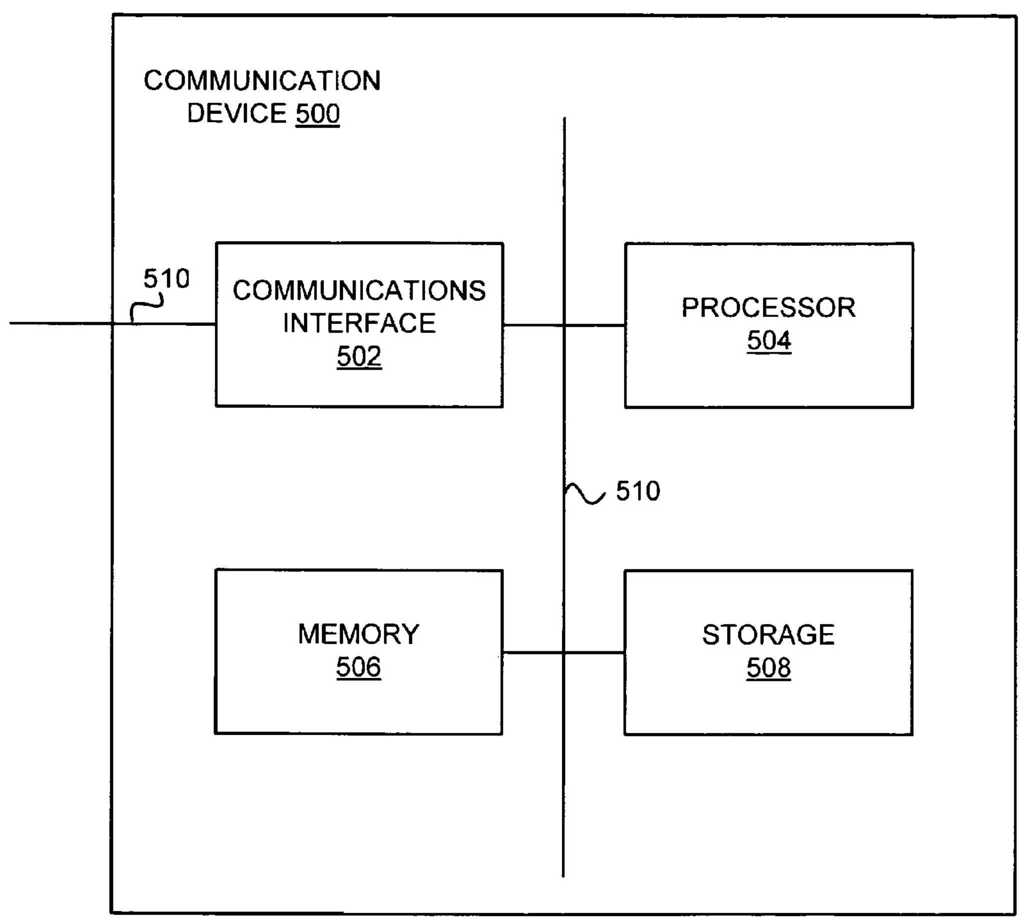
FIG. 5 shows an exemplary communication device.

FIG. 5 shows an exemplary communication device 500. The communication device 500 may comprise the device management engine 106 or the digital devices 102 according to some embodiments. The communication device 500 comprises at least a communications interface 502, a processor 504, a memory 506, and storage 508, which are all coupled to the bus 510. The bus 510 provides communications between the communications interface 502, the processor 504, the memory 506, and the storage 508.

The processor 504 executes instructions. The memory 506 permanently or temporarily stores data. Some examples of the memory 506 are RAM and ROM. The storage 508 also permanently or temporarily stores data. Some examples of the storage 508 are hard disks and disk drives.

The embodiments discussed herein are illustrative. As these embodiments are described with reference to illustrations, various modifications or adaptations of the methods and/or specific structures described may become apparent to those skilled in the art.

The above-described components and functions can be comprised of instructions that are stored on a computer-readable storage medium. The instructions can be retrieved and executed by a processor (e.g., processor 504). Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

While various embodiments have been described above, it should be understood that they have been presented by way of example only, and not limitation. For example, any of the elements associated with the device management engine 106 may employ any of the desired functionality set forth hereinabove. Thus, the breadth and scope of a preferred embodiment should not be limited by any of the above-described exemplary embodiments.

The invention claimed is:

1. A computer program product comprising a non-transitory computer-readable storage medium storing instructions executable by a computing device to perform operations for managing a plurality of digital media devices at a remote location with respect to the computing device, the operations comprising:

monitoring, by the computing device via a network, the plurality of digital media devices, wherein each of the plurality of digital media devices is associated with a plurality of functions;

while monitoring the plurality of digital media devices, receiving data by the computing device indicating that a lock mode is enabled for the plurality of digital media devices such that a subset of the plurality of functions is disabled, wherein, when the lock mode is enabled, the computing device is configured to perform operations comprising:

receiving, via the network, data indicating a command to cause at least one digital media device of the plurality of digital media devices to perform a first function;

determining that the first function is in the subset of the plurality of functions; and in response to determining the first function is in the subset of the plurality of functions, transmitting instructions via the network to the at least one digital media device that prevent the at least one digital media device from performing the first function;

receiving, by the computing device, data indicating that the lock mode is to be disabled for at least one of the plurality of digital media devices;

based on the received data indicating that the lock mode is to be disabled, transmitting, by the computing device to at least one of the plurality of digital media devices, a command to enable all functions in the plurality of functions associated with the at least one of the plurality of digital media devices; and transmitting at a predetermined time, by the computing device, to at least one of the plurality of digital media devices a command to revert an operational state of the at least one of the plurality of digital media devices to a default state.

2. The computer program product of claim 1, wherein the operations further comprise:

causing, by the computing device, a graphical display at the remote location to provide a graphical indication that the plurality of digital media devices is in the lock mode.

3. The computer program product of claim 1, wherein the operations further comprise:

causing, by the computing device, a graphical display at the remote location to provide a graphical indication that the first function is not being performed.

4. The computer program product of claim 1, wherein the operations further comprise:

receiving, by the computing device, data indicating a command to cause the at least one digital media device to perform a second function;

determining, by the computing device, that the second function is not in the subset of the plurality of functions; and responsively, transmitting, by the computing device, data to cause the at least one digital media device to perform the second function.

5. The computer program product of claim 1, wherein the subset of the plurality of functions comprises one or more of: (a) deletion of one or more files on the at least one digital media device, (b) displaying of one or more particular content, (c) streaming of media content, (d) accessing of one or more software applications on the digital media device, and (e) modification of settings of the digital media device.

6. The computer program product of claim 1, wherein the remote location is a retail location.

7. The computer program product of claim 1, wherein the plurality of digital media devices are demonstration devices.

8. The computer program product of claim 1, wherein receiving data indicating that a lock mode is to be enabled for the plurality of digital media devices comprises:

causing, by the computing device, a graphical display at the remote location to display a selectable option to enable the lock mode; and receiving, by the computing device, data indicating a selection of the option to enable the lock mode.

9. The computer program product of claim 8, wherein receiving data indicating that a lock mode is enabled for the plurality of digital media devices comprises:

prior to causing the graphical display at the remote location to display the selectable option to enable the lock mode, receiving, by the computing device, data indicating a credential to enable the lock mode of the plurality of digital media devices.

10. The computer program product of claim 1, wherein receiving the data indicating that the lock mode is to be disabled for at least one of the plurality of digital media devices comprises receiving data indicating that the lock mode to be disabled for a first device of the plurality of digital media devices, and wherein the operations further comprising:

receiving, by the computing device, first data indicating that the lock mode is to be disabled for the first device;

receiving, by the computing device, second data indicating a command to cause the first device to perform the first function; and in response to receiving the second data, causing, by the computing device, the first device to perform the first function.

11. The computer program product of claim 10, wherein receiving the first data comprises:

causing, by the computing device, a graphical display at the remote location to display a selectable option to disable the lock mode;

receiving, by the computing device, data indicating a selection of the option to disable the lock mode.

12. The computer program product of claim 11, wherein receiving the first data further comprises:

prior to causing the graphical display at the remote location to display the selectable option to disable the lock mode, receiving, by the computing device, third data indicating a credential to disable the lock mode of the first device.

13. A method of remotely managing a plurality of digital media devices, the method comprising:

monitoring, by a computing device via a network, the plurality of digital media devices, wherein the computing device is at a remote location with respect to the plurality of digital media devices, and wherein each of the plurality of digital media devices is associated with a plurality of functions;

while monitoring the plurality of digital media devices, receiving, by the computing device, first data comprising instructions to enable a lock mode for the plurality of digital media devices such that a subset of the plurality of functions is disabled;

based on the received first data, transmitting at a first time, by the computing device, to at least one of the plurality of digital media devices a command to disable the subset of the plurality of functions;

receiving, by the computing device, second data comprising instructions to disable the lock mode for at least one of the plurality of digital media devices;

based on the received second data, transmitting at a second time, by the computing device to at least one of the plurality of digital media devices, a command to enable all functions in the plurality of functions, wherein the second time is later than the first time.

14. The method of claim 13, wherein the received first data indicates credentials to enable the lock mode.

15. The method of claim 13, wherein the subset of the plurality of functions comprises one or more of: (a) deletion of one or more files on the at least one digital media device, (b) displaying of one or more particular content, (c) streaming of media content, (d) accessing one or more software applications on the digital media device, and (e) modification of settings of the digital media device.

16. The method of claim 13, further comprising:

periodically transmitting, by the computing device, to at least one of the plurality of digital media devices a command to revert an operational state of the plurality of digital media devices to a default state.

17. A computing device comprising:

a network interface;

a processor; and memory storing instructions executable by the processor to cause the computing device to perform operations for remotely managing a plurality of digital media devices configured to perform features that include a first set of features and a second, different set of features, the operations comprising:

receiving, via the network interface, data at a first time indicating that a lock mode is activated for the plurality of digital media devices such that the first set of features is disabled;

receiving, via the network interface, data indicating a command to cause at least a first device of the plurality of digital media devices to perform a first feature;

determining that the first function is a feature in the first set of features;

in response to determining the first feature is in the first set of features, transmitting, via the network interface to the first device, data causing a graphical display at the first device to provide a graphical indication that the first feature is unavailable;

receiving, via the network interface, data at a second, later time, the data indicating that the lock mode is deactivated for at least one of the plurality of digital media devices; and based on the received data indicating that the lock mode is deactivated, transmitting, via the network interface, to at least one of the plurality of digital media devices, a command to enable the first set of features.

18. The computing device of claim 17, the operations further comprising:

receiving, via the network interface, data indicating a command to cause the first device to perform a second feature;

determining that the second feature is in the second set of features; and in response to determining the second feature is in the second set of features, transmitting, via the network interface to the first device, data to cause the first device to perform the second feature.

19. The computing device of claim 18, the operations further comprising:

transmitting at a predetermined time, via the network interface, to at least one of the plurality of digital media devices a command to revert an operational state of the plurality of digital media devices to a default state.

* * * * *